United States Patent Office 3,505,304
Patented Apr. 7, 1970

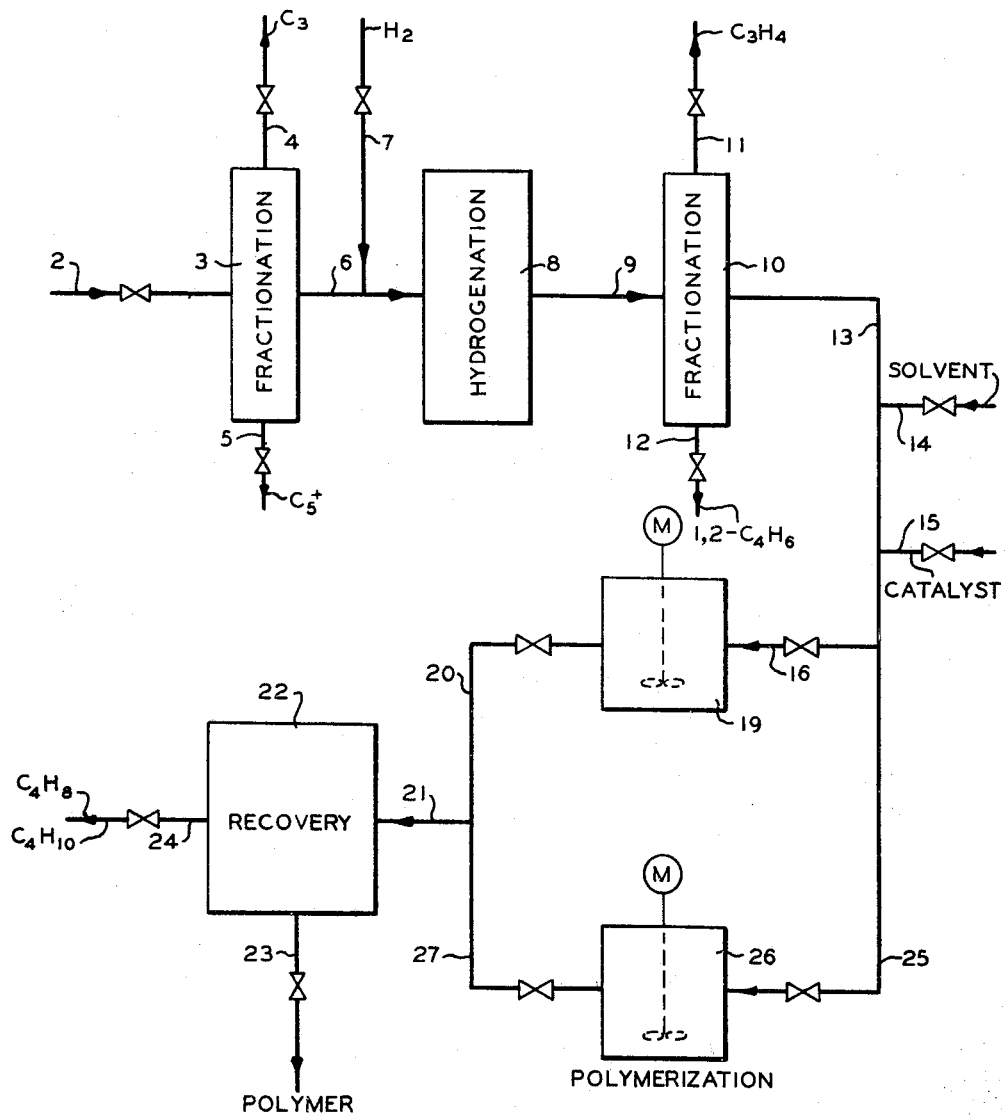

3,505,304
PRODUCTION OF POLYMER FROM LOW-PURITY CONJUGATED DIENE MONOMER FEED
Joseph W. Davison, James N. Short, James Q. Wood, and John M. Miles, Bartlesville, Okla., assignors to Phillips Petroleum Company, a corporation of Delaware
Filed Sept. 4, 1964, Ser. No. 394,526
Int. Cl. C08d 3/04, 3/06; C08f 3/16
U.S. Cl. 260—94.2                             3 Claims

ABSTRACT OF THE DISCLOSURE

Conjugated alkadiene polymers are made from hydrocarbon fractions containing at least one conjugated alkadiene, at least one alkene, at least one alkane, and minor amounts of alkynes, propadiene, and 1,2-butadiene, by removing at least a portion of the alkynes, propadiene, and 1,2-butadiene to produce a polymerization feed stream and thereafter polymerizing the polymerization feed stream.

---

This invention relates to the production of polymers, especially rubbery polymers, of conjugated dienes. In one aspect it relates to the production of such polymers and high-purity by-products from impure starting materials in a simple manner to produce high quality products in an economical process.

It is known in the prior art to produce rubbery polymers from conjugated dienes by the use of organolithium compounds as catalysts. It is also known that this polymerization reaction can be conducted in the presence of monoolefins which produce no deleterious effect on the polymerization catalysis. This enables one to utilize low-purity streams of alkadienes, such as 1,3-butadiene, to produce rubbery polymers. In this connection reference is made to U.S. Patents 2,146,447 (1939) and 2,264,811 (1941). It has previously been assumed that olefinic hydrocarbons other than conjugated dienes did not interfere with such polymerization reactions.

It is also known in the prior art to remove acetylenic compounds from admixture with monoolefins and diolefins by selective catalytic hydrogenation of the acetylenic hydrocarbons. Processes of this type are disclosed in U.S. Patent 3,076,858 (1963).

Thus the prior art proceeded on the assumption that impure butadiene streams could readily be converted to polymers by the use of organolithium catalysts without removal of any accompanying unsaturates, with the possible exception of acetylenes, which could readily be removed by selective catalytic hydrogenation.

We have found that certain other hydrocarbons often present in low-purity diolefin streams, such as petroleum refinery streams obtained by cracking, are deleterious to the polymerization of conjugated dienes in the presence of organolithium catalysts. These deleterious hydrocarbons include nonconjugated diolefins, and particularly those nonconjugated diolefins which are isomerizable to 1-alkynes. Among the deleterious hydrocarbons frequently encountered in streams of this type are propadiene (allene) and 1,2-butadiene.

We have further found that these nonconjugated diolefins which are isomerizable to 1-alkynes are not removed by the selective hydrogenation usually applied to such streams for the removal of alkynes. At least they are not removed to the desired extent.

An object of this invention is to produce polymers, especially rubbery polymers. Another object of the invention is to produce polymers from impure diolefin streams in a simple and economic manner. A further object is to produce monoolefin-containing streams free of deleterious impurities. A further object is to improve yields of alkadiene polymers obtainable by organolithium catalysis. Other objects and advantages will become apparent to those skilled in the art on studying this disclosure.

According to this invention, rubbery polymers of the conjugated dienes are produced from low-purity $C_3$ to $C_5$ hydrocarbon streams containing conjugated alkadienes together with alkenes and alkanes, as well as minor proportions of nonconjugated alkadienes, by removing the nonconjugated alkadienes, and any alkynes, prior to polymerization of the conjugated alkadienes in the presence of an organolithium catalyst and said alkenes and alkanes.

The accompanying drawing is a flow sheet illustrating one embodiment of our invention.

In the following disclosure, our invention is described in connection with the production of rubbery homopolymers and copolymers of 1,3-butadiene. Those skilled in the art will recognize, however, that the invention is also applicable to the production of polymers from $C_5$ diolefins such as isoprene and piperylene.

The following tabulation lists certain unsaturated hydrocarbons which we have found to be deleterious to the polymerization of 1,3-butadiene in the presence of an organolithium catalyst.

|  | Boiling Point | |
| --- | --- | --- |
|  | °F. | °C. |
| Propadiene (Allene)<br>$H_2C=C=CH_2$ | −30 | −34 |
| 1,2-butadiene<br>$\phantom{H_2C=C=}H$<br>$H_2C=C=C-CH_3$ | 52 | 11 |
| 3-methyl-1,2-butadiene<br>$H_2C=C=C-CH_3$<br>$\phantom{H_2C=C=C-}|$<br>$\phantom{H_2C=C=C-}CH_3$ | 106 | 41 |
| 1,4-pentadiene<br>$\phantom{H_2C=C}H\ \ H_2H$<br>$H_2C=C-C-C=CH_2$ | 79 | 26 |
| 1,2-pentadiene<br>$\phantom{H_2C=C=}H\ \ H_2$<br>$H_2C=C=C-C-CH_3$ | 113 | 45 |
| 2,3-pentadiene<br>$\phantom{H_3C-C=}H\phantom{=C=}H$<br>$H_3C-C=C=C-CH_3$ | 104 | 40 |
| Cyclopentadiene<br>$HC=\!=\!=CH$<br>$\phantom{HC}|\phantom{=\!=\!=}|$<br>$HC\phantom{=\!=}CH_2$<br>$\phantom{HC}\diagdown_C\diagup$<br>$\phantom{HCC}H$ | 106 | 41 |
| Methylacetylene<br>$H_3C-C\equiv CH$ | −10 | −23 |
| Ethylacetylene<br>$\phantom{H_3C-}H_2$<br>$H_3C-C-C\equiv CH$ | 47 | 8 |
| Vinylacetylene<br>$\phantom{H_2C=}H$<br>$H_2C=C-C\equiv CH$ | 41 | 5 |
| Diacetylene<br>$HC\equiv C-C\equiv CH$ | 50 | 10 |
| Dimethylacetylene<br>$H_3C-C\equiv C-CH_3$ | 82 | 28 |

The following is an analysis of a refinery stream obtained by the cracking of naphtha:

Hydrogen—<5 p.p.m.
Oxygen—<1 p.p.m.
Nitrogen—2 p.p.m.
Methane—0.21 wt. percent
Ethylene—0.06 wt. percent
Ethane—0.01 wt. percent
Acetylene ($C_2H_2$)—<5 p.p.m.
Propylene—4.40 wt. percent Propane—0.29 wt. percent
Allene—0.24 (2400 p.p.m.)
Methyl acetylene—0.32 wt. percent
Ethyl acetylene—0.05 wt. percent
Cyclopropane—0.02 wt. percent
Isobutane—1.23 wt. percent
Normal butane—5.32 wt. percent
Isobutylene and butene-1—46.11 wt. percent
Trans-butene-2—4.57 wt. percent
Cis-butene-2—2.48 wt. percent
1,3-butadiene—34.41 wt. percent
1,2-butadiene—0.02 (200 p.p.m.)
Vinyl acetylene—0.29 wt. percent
Isopentane—<0.01 wt. percent
Distillation residue—0.26 wt. percent Generally, our invention is appicable to streams such as that illustrated hereinbefore which contain from about 20 to about 80 percent of 1,3-butadiene. We have found that the conjugated dienes in such streams can be converted to rubbery polymers by organolithium catalysis with minimum purification of the streams and with optimum yields.

Reference is now made to the accompanying drawing. In one embodiment of our invention, an impure $C_4$ stream containing minor amounts of $C_3$ and lighter hydrocarbons together with minor amounts of $C_5$ and heavier hydrocarbons enters the system through inlet 2. This stream is fractionated in fractionation zone 3 in accordance with fractional distillation procedures well known in the prior art. A $C_3$ and lighter fraction is removed overhead through outlet 4, and a $C_5$ and heavier fraction is removed as a kettle product through outlet 5. A purified $C_4$ fraction containing, as its main constituents, 1,3-butadiene, one or more butenes and butanes and containing as impurities, acetylenes such as methylacetylene, ethylacetylene, vinylacetylene, diacetylene, propadiene, and 1,2-butadiene is passed through conduit 6 to selective hydrogenation zone 8. A small amount of hydrogen necessary to saturate the acetylenic hydrocarbons is added through inlet 7. Ordinarily, the amount of hydrogen added is relatively small since the selectivity of the hydrogenation is not perfect and an excess of hydrogen causes losses of 1,3-butadiene by hydrogenation.

The hydrogenation per se conducted in zone 8 is not our invention and is known in the prior art.

The partially hydrogenated stream containing 1,3-butadiene, the butenes and butanes, together with small amounts of propadiene and 1,2-butadiene as impurities, and substantially free of acetylenic compounds, is passed through conduit 9 to fractionation zone 10, which ordinarily includes one or more fractional distillation columns with appurtinent equipment. A light fraction comprising the propadiene together with any remaining hydrogen or other $C_3$ hydrocarbons is removed overhead through outlet 11. This fraction can also include some of the 1,3-butadiene to ensure complete removal of the propadiene. A kettle fraction comprising most of the 1,2-butadiene present is removed through outlet 12. This can also include part of the desired $C_4$ hydrocarbons to ensure substantial removal of the 1,2-butadiene. It also contains any deleterious $C_5$ unsaturates, including those mentioned hereinbefore. A purified stream now comprising almost exclusively 1,3-butadiene, at least one butene, and at least one butane is recovered as a purified fraction of intermediate boiling range through conduit 13. Ordinarily this stream would be diluted with a solvent such as normal hexane before entering the polymerization section. However, if so desired, the $C_4$ hydrocarbons already present can serve as the diluent without further dilution. When additional diluent is desired, a diluent such as normal hexane, for example, can be added through inlet 14. If it is desired to produce a copolymer rather than a homopolymer of butadiene, comonomer, e.g., styrene, can also be added through inlet 14.

An organolithium catalyst, e.g., n-butyllithium, is added through inlet 15. The resulting mixture is essentially in the liquid phase at this point and is passed through conduit 16 to polymerization zone 19 wherein the 1,3-butadiene is converted to polymer in the presence of the organolithium catalyst. The reaction mixture is removed through conduit 20 and passed through conduit 21 to recovery zone 22. Recovery zone 22 functions in a manner known to the art and the details thereof form no part of this invention. Ordinarily, the recovery system includes the addition of a catalyst-destroying compound, such as water, one or more fractional distillation columns or solvent flashing equipment together with a stripping unit or the like used for the recovery of elastomeric polymers from hydrocarbon solution in accordance with known prior practice. From recovery zone 22, a rubbery polymer of butadiene is recovered through outlet 23. A by-product stream comprising butenes and butane, is recovered through outlet 24. This stream, having passed through the various fractionations and the acetylene hydrogenation as well as the butadiene polymerization, is highly purified and is ideal feed for an alkylation unit such as one utilizing hydrofluoric acid catalyst. As is known in the art, the presence of acetylenic and dioolefinic impurities in an alkylation feed wastes catalyst through the formation of catalyst-soluble oils. Similar effects on many monoolefin polymerization catalysts have been observed. Thus one of the many advantages of the present invention is that it provides a by-product stream of highly purified monoolefin which can readily be utilized in an alkylation or polymerization unit.

Frequently, though not necessarily, the polymerization reaction is conducted as a batch reaction. Thus after a suitable reaction time in reactor 19 the reaction mixture is passed to recovery zone 22. While this recovery operation is proceeding, the purified feed in conduit 13 is passed through valve conduit 25 to standby reaction zone 26 in which the polymerization is conducted as in reaction zone 19. After suitable residence time in reaction zone 26 the products can be passed through conduits 27 and 21 to recovery zone 22.

In a series of runs illustrating a specific embodiment of this invention, the 1,3-butadiene fraction (derived from propane cracking) utilized as feed to a polymerization unit utilizing a n-butyllithium catalyst had the following composition after selective hydrogenation to remove alkynes:

Ethane—0.02 wt. percent
Propane—1.48 wt. percent
Propylene—0.53 wt. percent
Isobutane—1.08 wt. percent
n-Butane—3.74 wt. percent
1-butene and isobutylene—23.43 wt. percent
Trans-butene-2—5.15 wt. percent
Cis-butene-2—4.14 wt. percent
1,2-butadiene—0.16 (1600 p.p.m.)
1,3-butadiene—59.95 wt. percent
Cyclopropane—0.04 wt. percent
Allene—0.08 (800 p.p.m.)
Methylacetylene—<10 p.p.m.
Vinylacetylene—<10 p.p.m.
Heavier—0.20 wt. percent The feed was diluted with 780 parts by weight of cyclohexane per hundred parts by weight of butadiene and subjected to polymerization at 122° F. for a period of 17 hours. The following data were obtained:

| n-Butyllithium, mhm. | Conversion, percent | Inherent Viscosity |
|---|---|---|
| 2.60 | 75 | 1.53 |
| 2.80 | 85 | 1.41 |
| 3.00 | 97 | 1.22 |
| 3.20 | 100 | 1.16 |
| 3.40 | 99 | 1.14 |

"mhm." signifies millimoles per 100 grams monomer.

In this series of runs, it was desired to produce a polybutadiene having an inherent viscosity of at least 2.3. It will be noted from the data that when allene and 1,2-butadiene were present in amounts of 800 and 1600 parts per million the inherent viscosity was unduly low. Also, the polymer had an undesirable yellow color. Furthermore, relatively large amounts of butyllithium catalyst were required in order to obtain conversions of 75 percent and higher.

In a further series of runs, a selectively hydrogenated, cracked propane feed having the following composition was utilized for polymerization under substantially the same conditions as in the foregoing runs:

Allene—0 wt. percent
Isobutane—0.76 wt. percent
n-butane—1.26 wt. percent
1-butene and isobutylene—26.57 wt. percent
Trans-butene-2—6.69 wt. percent
Cis-butene-2—5.73 wt. percent
1,3-butadiene—58.61 wt. percent
1,2-butadiene—0.26 (2600 p.p.m.)
Heavier—0.12 wt. percent The above feed was subjected to polymerization conditions in the presence of n-butyllithium at a polymerization time of 21 hours. The following results were obtained:

| n-Butyllithium, mhm. | Conversion, percent | Inherent Viscosity |
|---|---|---|
| 1.0 | 25 | 1.95 |
| 1.2 | 60 | 2.05 |
| 1.4 | 80 | 2.02 |
| 1.6 | 96 | 1.75 |
| 1.8 | 98 | 1.51 |
| 2.0 | 99 | 1.36 |

Allene was absent from this feed. It will be noted that improvement was obtained. It was possible to obtain satisfactory conversions at relatively low catalyst concentrations, the color of the polymer was white, and the inherent viscosities were increased. However, the inherent viscosity desired was still not obtained.

In a third series of runs the partially hydrogenated, cracked propane feed had the following composition:

Propane—77 p.p.m.
Cycloprone—<10 p.p.m.
Allene—<5 p.p.m.
Methylacetylene—<5 p.p.m.
Isobutane—0.75 wt. percent
n-butane—1.26 wt. percent
1-butene and isobutylene—26.76 wt. percent
Trans-butene-2—6.19 wt. percent
Cis-butene-2—4.65 wt. percent
1,3-butadiene—60.36 wt. percent
1,2-butadiene—0.04 (400 p.p.m.)
Vinylacetylene—8 p.p.m.
Heavier—<0.10

This feed was subjected to polymerization under the same conditions as in the first series of runs. The following data were obtained:

| n-Butyllithium, mhm. | Conversion, percent | Inherent Viscosity |
|---|---|---|
| 0.60 | 0 | — |
| 0.80 | 18 | 2.07 |
| 1.00 | 81 | 3.26 |
| 1.20 | 95 | 2.56 |
| 1.40 | 99 | 1.95 |
| 1.70 | 98 | 1.47 |
| 2.00 | 98 | 1.20 |

In the foregoing runs, the polymer was white, and satisfactory conversions were obtained at approximately 1 mhm. butyllithium. The resulting polymers had desirably high inherent viscosities. Increasing the concentration of butyllithium decreased the inherent viscosity of the polymer. This is the normal effect of increased catalyst concentration, since a larger number of polymer chains are initiated by the larger number of butyllithium molecules present. This merely indicates the desirability of avoiding an excess of catalyst.

As previously indicated, the acetylenes can be removed from the butadiene feed by selective hydrogenation in accordance with the prior art. One satisfactory catalyst for this purpose is copper deposited on fuller's earth and promoted with small amounts of iron, nickel and chromium. One such catalyst contains approximately 25 weight percent copper, 1.8 weight percent iron, 0.7 weight percent nickel, and a trace of chromium. This catalyst can be used satisfactorily at approximately 320° F. with the hydrocarbon feed in the vapor state at a pressure of 35 p.s.i.g. and space velocity of 200 to 400 volumes of feed per volume of catalyst per hour. Approximately 1.2 to 1.5 mols of hydrogen per mol of acetylene is added to the feed. As the hydrogenation proceeds and the catalyst loses its activity, the reaction temperature is gradually increased to about 450° F. Catalyst regeneration occurs in accordance with prior art practice. It will be readily recognized by those skilled in the art that some variation will be necessary to obtain optimum purification for any particular feed. Such optimum conditions can readily be ascertained by routine test and reference to the prior art, e.g. U.S. Patent 3,076,858 (1963).

The polymerization of 1-3,-butadiene to rubbery polymers is ordinarily conducted with the butadiene in the liquid phase at temperatures which can range from −50 to +100° C., for example. The organolithium catalysts utilizable in this reaction are compounds of lithium in which the lithium atom is bound directly to a carbon atom of an alkyl, cycloalkyl, or aryl hydrocarbon radical containing from 3 to 20 carbon atoms. Examples of such compounds include isopropyllithium, n-propyllithium, n-butyllithium, tert-butyllithium, the amyllithiums, the octyllithiums, cyclohexyllithium, phenyllithium, the lithium biphenyls, and the naphthyllithiums, including the dilithium naphthalenes, and the dilithium methyl naphthalenes. This class of compounds and their preparation are well known.

We have found it desirable in the practice of our invention to decrease the total content of acetylenes plus allene in the polymerization feed to less than 50 parts per million by weight. Substantially complete removal is, of course, desirable. It is further desirable that the allene content of the polymerization feed be less than 10 parts per million by weight. We have further found it desirable to decrease the 1,2-butadiene content of the polymerization feed to not more than 400 parts per million by weight. These maxima are not absolute limitations, however, since benefit can be realized by removal of any appreciable part of the impurities discussed.

We claim:

1. A process for producing polymers from a $C_4$ hydrocarbon fraction comprising principally a mixture of 1,3-butadiene, butenes and butanes, together with minor amounts of alkynes, propadiene and 1,2-butadiene, the amount of propadiene being in excess of 10 parts per million by weight and the amount of 1,2-butadiene being in excess of 400 parts per million by weight, which process comprises selectively hydrogenating the alkynes, removing the 1,2-butadiene and the propadiene by fractional distillation, to produce a 1,3-butadiene containing feed stream wherein the propadiene plus acetylenes are reduced to amounts of less than 50 parts per million by weight, propadiene is reduced to less than 10 parts per million by weight, and 1,2-butadiene is reduced to less than 400 parts per million by weight, polymerizing said 1,3-butadiene containing feed stream in the presence of an organolithium catalyst in the presence of said butenes and said butanes, recovering said polymers, and recovering butenes free of diolefins and alkynes.

2. A process for producing polymers from a $C_4$ hydrocarbon fraction containing principally a mixture of 1,3- butadiene, at least one butene and at least one butane, together with minor amounts of 1,2-butadiene and propadiene, the amount of propadiene being in excess of 10 parts per million by weight and the amount of 1,2-butadiene being in excess of 400 parts per million by weight, which process comprises removing sufficient 1,2-butadiene and propadiene to produce a 1,3-butadiene containing feed stream containing less than 400 parts per million by weight of 1,2-butadiene and less than 10 parts per million by weight propadiene and any alkynes present, and polymerizing said 1,3-butadiene containing feed stream in the presence of an organolithium catalyst and in the presence of remaining butene and butane.

3. A process for producing polymers from a $C_3$ to $C_5$ hydrocarbon fraction containing principally a mixture of at least one conjugated alkadiene, at least one alkene and at least one alkane together with minor amounts of alkynes, propadiene, and 1,2-butadiene, the amount of propadiene being in excess of 10 parts per million by weight and the amount of 1,2-butadiene being in excess of 400 parts per million by weight, which process comprises removing sufficient propadiene, 1,2-butadiene and alkynes present to produce a conjugated alkadiene feed stream containing not more than 400 parts per million by weight of 1,2-butadiene, less than 50 parts per million by weight of propadiene plus alkynes and less than 10 parts per million by weight of propadiene and polymerizing said conjugated alkadiene containing feed stream in the presence of an organolithium catalyst and in the presence of the remaining monoolefin and alkane.

References Cited

UNITED STATES PATENTS

| | | | |
|---|---|---|---|
| 3,280,094 | 10/1966 | Forman | 260—94.2 |
| 3,242,227 | 3/1966 | Kroeper et al. | 260—681.5 |
| 3,281,489 | 10/1965 | Goering | 260—681.5 |
| 3,299,032 | 1/1967 | Rollmann | 260—94.7 |
| 3,299,163 | 1/1967 | Zelinski | 260—681.5 |

FOREIGN PATENTS

| | | |
|---|---|---|
| 661,456 | 4/1963 | Canada. |
| 649,296 | 9/1962 | Canada. |

JOSEPH L. SCHOFER, Primary Examiner

W. F. HAMROCK, Assistant Examiner

U.S. Cl. X.R.

260—95, 681.5